United States Patent
Hsu (10) Patent No.: US 8,370,695 B2
(45) Date of Patent: Feb. 5, 2013

(54) METHOD AND APPARATUS FOR IMPROVING UPLINK TRANSMISSION OF TRANSMISSION TIME INTERVAL BUNDLING IN A WIRELESS COMMUNICATION SYSTEM

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 621 days.

(21) Appl. No.: 12/613,538

(22) Filed: Nov. 6, 2009

(65) Prior Publication Data

US 2010/0115367 A1 May 6, 2010

Related U.S. Application Data

(60) Provisional application No. 61/112,153, filed on Nov. 6, 2008.

(51) Int. Cl.
*G06F 11/00* (2006.01)
(52) U.S. Cl. ............... 714/748; 714/749; 714/750
(58) Field of Classification Search .......... 714/748, 714/749, 750
See application file for complete search history.

(56) References Cited

U.S. PATENT DOCUMENTS

| | | | | |
|---|---|---|---|---|
| 2009/0307554 A1* | 12/2009 | Marinier et al. | ............... | 714/748 |
| 2010/0034162 A1* | 2/2010 | Ou et al. | ............... | 370/329 |
| 2010/0042888 A1* | 2/2010 | Kuo | ............... | 714/749 |
| 2011/0141952 A1* | 6/2011 | Wang et al. | ............... | 370/294 |

FOREIGN PATENT DOCUMENTS

CN 101119184 A 2/2008

OTHER PUBLICATIONS

Asustek: "Clarification on UE behaviour at TTI bundling configuration", 3GPP TSG-RAN WG2 #64, R2-086144, Nov. 10-14, 2008, pp. 1-3, XP050321054, Prague, Czech Republic.
Huawei: "max HARQ transmission number of TTI bundling", 3GPP TSG-RAN WG2 Meeting #63, R2-084039, Aug. 18-22, 2008, XP050319199, Jeju, Korea.
Nokia Corporation et al: "Bundling Issues", 3GPP TSG-RAN WG2 Meeting #62bis, R2-083107, Jun. 30-Jul. 4, 2008, XP050140545, Warsaw, Poland.
Ericsson: "TTI-Bundling Considerations for TDD", 3GPP TSG-RAN WG2 #62, Tdoc R2-082148, May 5-9, 2008, pp. 1-8, XP050139927, Kansas City, USA.
Nokia & Nokia Siemens Networks: "LTE TDD Control Signalling for Uplink Multi-TTI Scheduling", 3GPP TSG RAN WG1 Meeting #51bis, R1-080305, Jan. 14-18, 2008, XP050108826, Sevilla, Spain.
Ericsson: "On Uplink Coverage for LTE", 3GPP TSG-RAN WG1 #52, R1-080865, Feb. 11-15, 2008, XP050109344, Sorrento, Italy.
3GPP, 3GPP TS 36.321 v8.3.0 MAC specification, Sep. 2008.
3GPP, 3GPP TSG-RAN2#61bis R2-081446, Mar. 2008.
3GPP, 3GPP TSG-RAN2#61bis R2-081465, Mar. 2008.
3GPP, 3GPP TSG-RAN2#61bis R2-081466, Mar. 2008.
3GPP, 3GPP TSG-RAN2#62bis R2-083480, Jun. 2008.
3GPP, 3GPP TSG-RAN2#63bis R2-083867, Aug. 2008.
3GPP, 3GPP TSG-RAN2#63bis R2-083888, Aug. 2008.
3GPP, 3GPP TSG-RAN2#63bis R2-084875, Aug. 2008.
3GPP, 3GPP TSG-RAN2#63bis R2-085025, Sep. 2008.

\* cited by examiner

*Primary Examiner* — Marc Duncan
(74) *Attorney, Agent, or Firm* — Winston Hsu; Scott Margo (57) ABSTRACT

A method of improving uplink transmission of TTI bundling for a MAC layer of a user equipment in a wireless communication system includes receiving a first signaling and a second signaling, and when a transmission collision happens between a first transmission corresponding to the first signaling and a second transmission corresponding to the second signaling, handling the transmission collision according to a type of the first signaling and a type of the second signaling.

2 Claims, 12 Drawing Sheets

METHOD AND APPARATUS FOR IMPROVING UPLINK TRANSMISSION OF TRANSMISSION TIME INTERVAL BUNDLING IN A WIRELESS COMMUNICATION SYSTEM

CROSS REFERENCE TO RELATED APPLICATIONS

This application claims the benefit of U.S. Provisional Application No. 61/112,153, filed on Nov. 6, 2008 and entitled "METHOD AND APPARATUS FOR IMPROVING TRANSMISSION TIME INTERVAL BUNDLING IN A WIRELESS COMMUNICATIONS SYSTEM", the contents of which are incorporated herein.

BACKGROUND OF THE INVENTION

1. Field of the Invention

The present invention relates to a method and related communication device in a wireless communication system for improving uplink transmission, and more particularly, to a method and related communication device for improving uplink transmission of transmission time interval bundling.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The radio protocol stacks of the E-UTRAN is given including a radio resource control layer (RRC), a packet data convergence protocol layer (PDCP), a radio link control layer (RLC), a media access control layer (MAC), and a physical layer (PHY).

In order to improve uplink (UL) coverage of LTE at cell edge, transmission time interval (TTI) bundling is introduced. Activation or deactivation of TTI bundling is controlled by an RRC command and a parameter TTI_BUNDLE_SIZE, which provides the number of TTIs of a TTI bundle, is 4. Within a TTI bundle, hybrid automatic repeat request (HARQ) retransmissions are non-adaptive and are performed without waiting for feedback of previous transmissions. A HARQ feedback, e.g. positive-acknowledgement (ACK)/negative-acknowledgement (NACK) information, for a TTI bundle is only received for the TTI corresponding to the TTI_BUNDLE_SIZE, which is the last TTI of the bundle. A retransmission of a TTI bundle is also a TTI bundle. Note that, for transmission of an uplink message containing the a cell radio network temporary identifier (C-RNTI) MAC control element or an uplink message including a common control channel (CCCH) service data unit (SDU) during random access, TTI bundling does not apply.

A HARQ entity at a UE maintains a number of parallel HARQ processes allowing transmissions to take place continuously while waiting for the HARQ feedback on the successful or unsuccessful receptions of previous transmissions, and also carries new transmission parameters, e.g. a new data indicator (NDI) and spectral resources including a physical resource block (PRB) and a modulation and coding scheme (MCS), etc., for each HARQ process. At a given TTI, if an UL grant is indicated for the TTI, the HARQ entity identifies a HARQ process where a transmission in the TTI should take place. Based on a physical downlink control channel (PDCCH), the HARQ entity also determines whether a retransmission is adaptive or non-adaptive and provides transmission parameters for adaptive retransmission. When an ACK for a HARQ process is received, the HARQ entity considers the HARQ process suspended and stops generating non-adaptive retransmission for the HARQ process.

For a HARQ process, an adaptive transmission, which is a new transmission or an adaptive retransmission, is performed on the resource including PRB and MCS indicated on the PDCCH, and a non-adaptive retransmission is performed on the same resource with the same MCS which is used for the last transmission attempt. Whether an adaptive transmission is a new transmission or an adaptive retransmission is recognized by the NDI provided in the HARQ entity. A transmission in which the NDI is toggled compared to the value in the previous transmission of this HARQ process is a new transmission, while a transmission in which the NDI is not toggled is an adaptive retransmission.

The UE cannot act on TTI bundling activation or TTI bundling deactivation immediately when receiving an RRC command of bundling activation/deactivation because there is an indefinite processing delay between when the UE receives the RRC command and when the UE decodes the RRC command. Due to the uncertainty of the timing of TTI bundling deactivation, a non-bundled transmission (whether it is a new transmission or a non-adaptive retransmission) may collide with a bundled transmission (whether it is an adaptive transmission or a non-adaptive retransmission).

Figure 1:
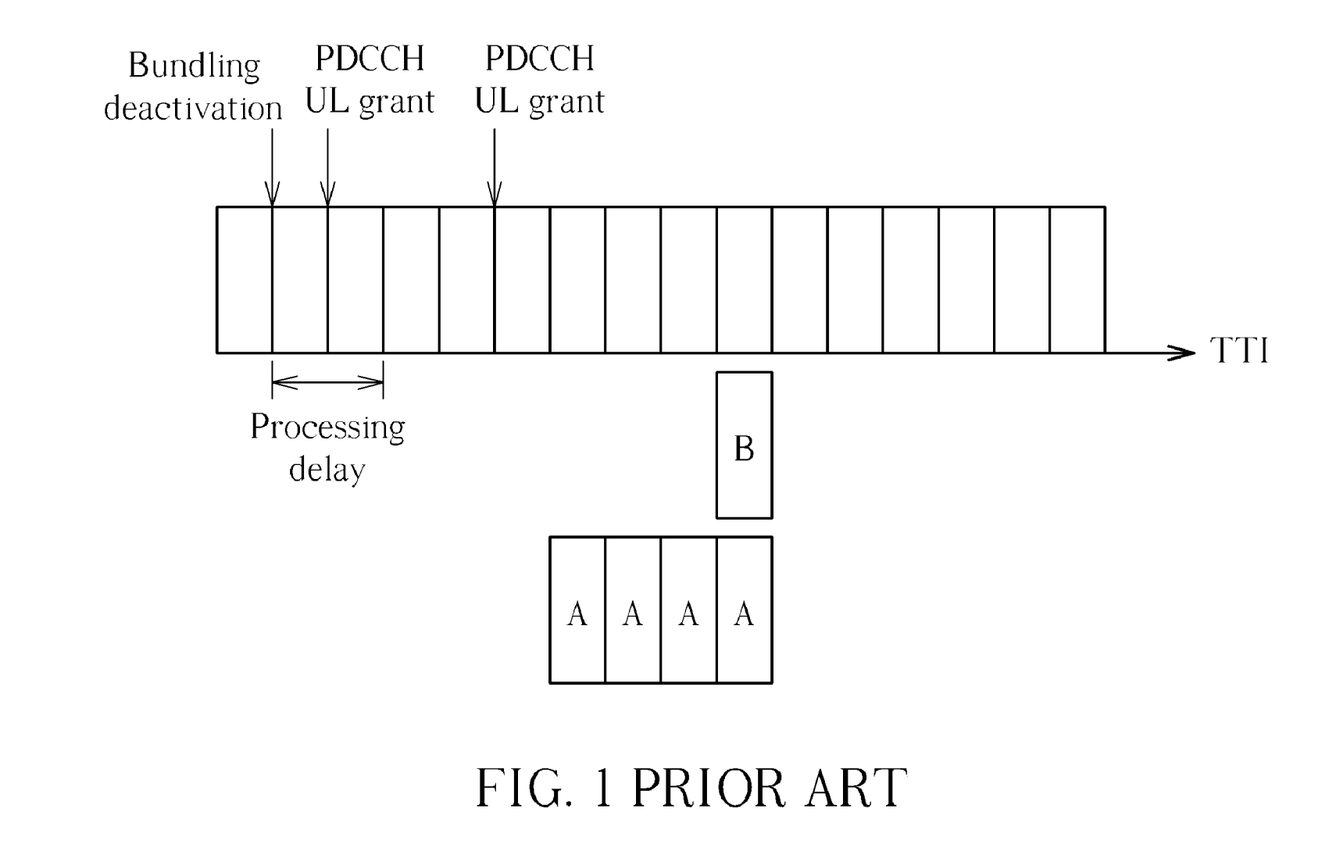
FIG. 1 and FIG. 2 are timing diagrams illustrating a transmission collision between a non-bundled transmission and a bundled transmission according to the prior art.
Figure 2:
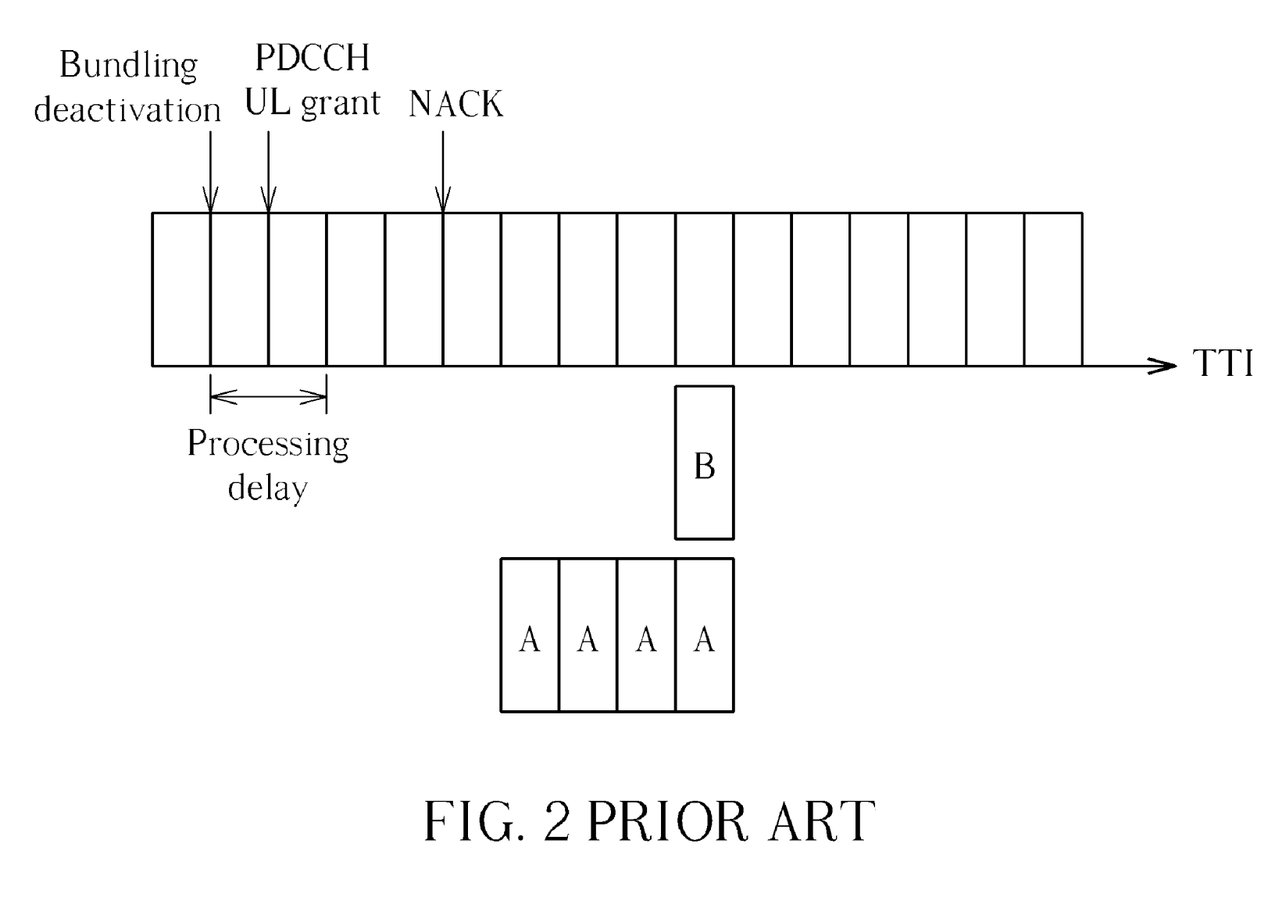

Please refer to FIG. 1 and FIG. 2, which are timing diagrams illustrating a transmission collision between a non-bundled transmission and a bundled transmission according to the prior art. As shown in FIG. 1, there are two PDCCH UL grants. The earlier PDCCH UL grant is received during the processing delay of TTI bundling deactivation, so that a transmission corresponding to the earlier PDCCH UL grant is still a bundled transmission, which takes place at 4 TTIs after the earlier PDCCH UL grant is received. The later PDCCH UL grant is received after the processing delay, and a corresponding non-bundled transmission takes place at 4 TTIs after the later PDCCH UL grant is received. As a result, the non-bundled transmission collides with the bundled transmission. In FIG. 2, similarly, a non-bundled retransmission triggered by a NACK collides with a bundled transmission requested by a PDCCH UL grant.

In addition to the processing delay, another reason for the transmission collision is the limited processing power of the eNB. When TTI bundling is activated, the eNB may assign colliding UL grants, which result in the transmission collision, carelessly, or report HARQ feedbacks successively and is not aware of the transmission collision. Besides, when the traffic load of the eNB is heavy, the eNB may have no way to avoid colliding UL grants in time even though it is aware of the collision. For this reason, a bundled transmission (whether it is an adaptive transmission or a non-adaptive retransmission) may collide with another bundled transmission (whether it is an adaptive transmission or a non-adaptive retransmission), which is illustrated in detail as follows.

Figure 3:
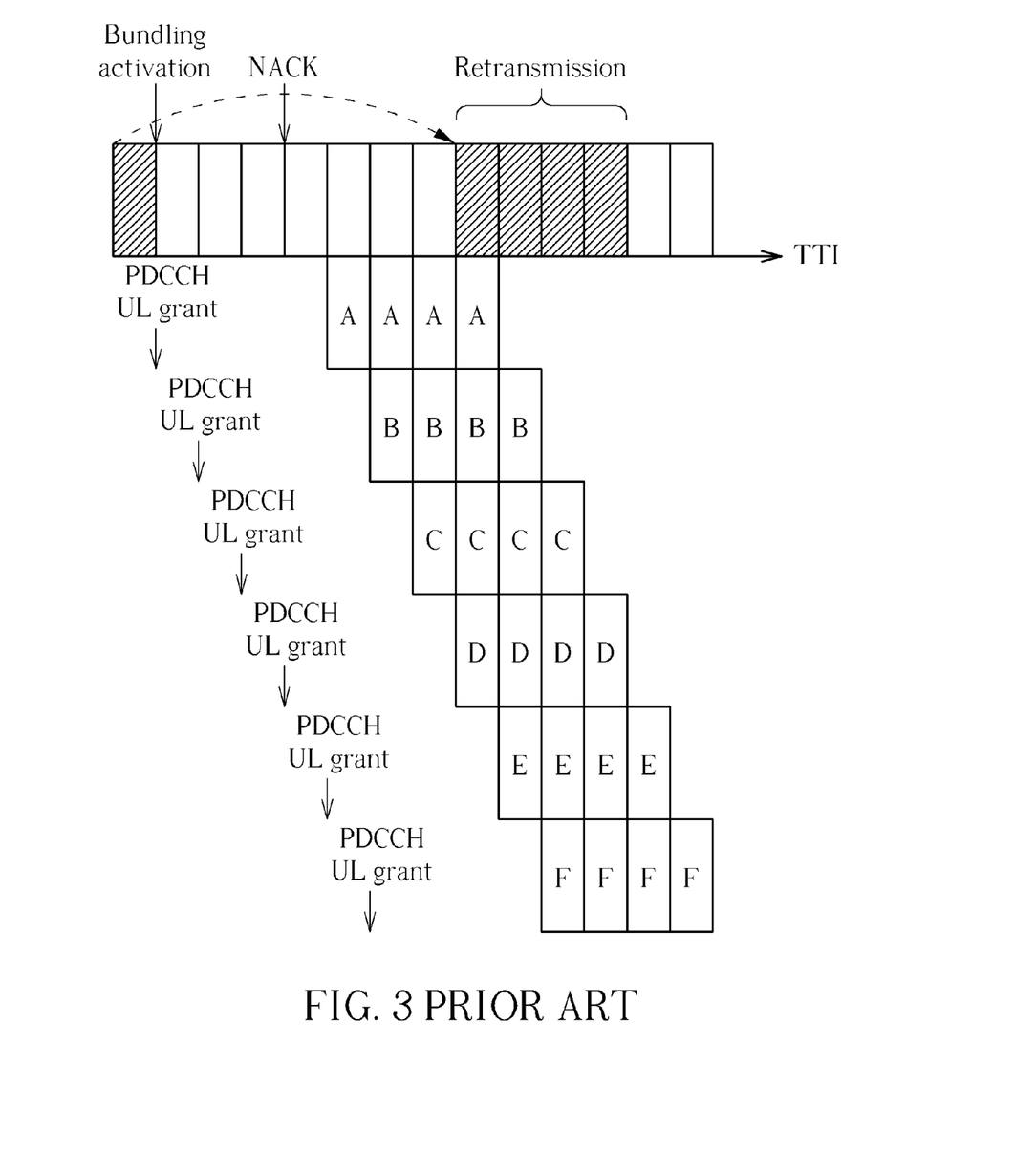
FIG. 3 to FIG. 5 are a timing diagram illustrating transmission collisions between bundled transmissions according to the prior art.

Please refer to FIG. 3, which is a timing diagram illustrating transmission collisions between bundled transmissions according to the prior art. As shown in FIG. 3, a transmission before TTI bundling is activated is transmitted unsuccessfully and thus the UE receives a NACK. The bundled non-adaptive retransmission is triggered by the NACK and takes places at 8 TTIs after the previous transmission. At the same time, after TTI bundling is activated, the eNB assigns PDCCH UL grants frequently without considering the possible transmission collision. As a result, these bundled transmissions denoted as AAAA, BBBB, ..., and FFFF in FIG. 3 collide with the non-adaptive retransmission triggered by the NACK. Moreover, these bundled transmissions requested by the PDCCH UL grants also overlap with each other.

Figure 4:
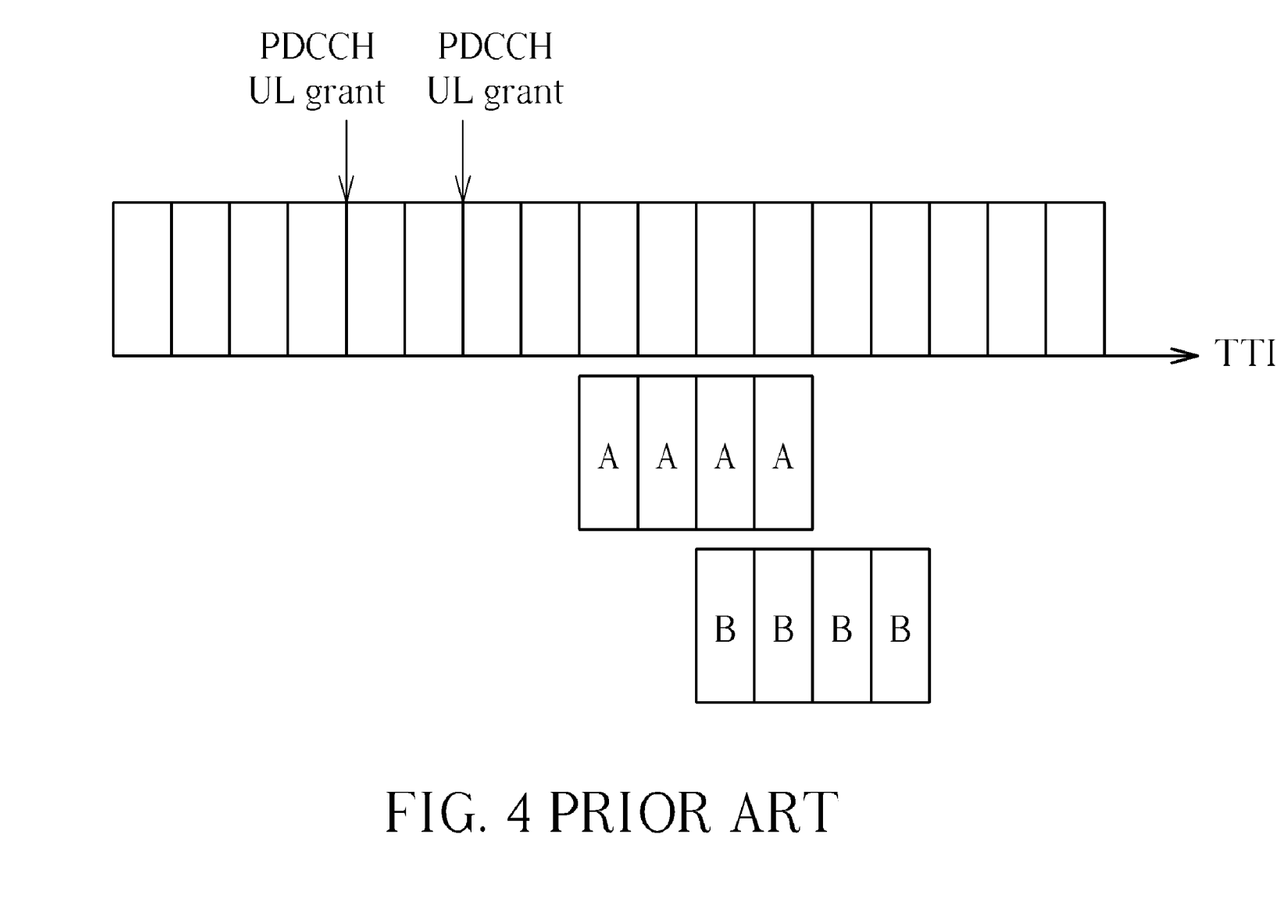
Figure 5:
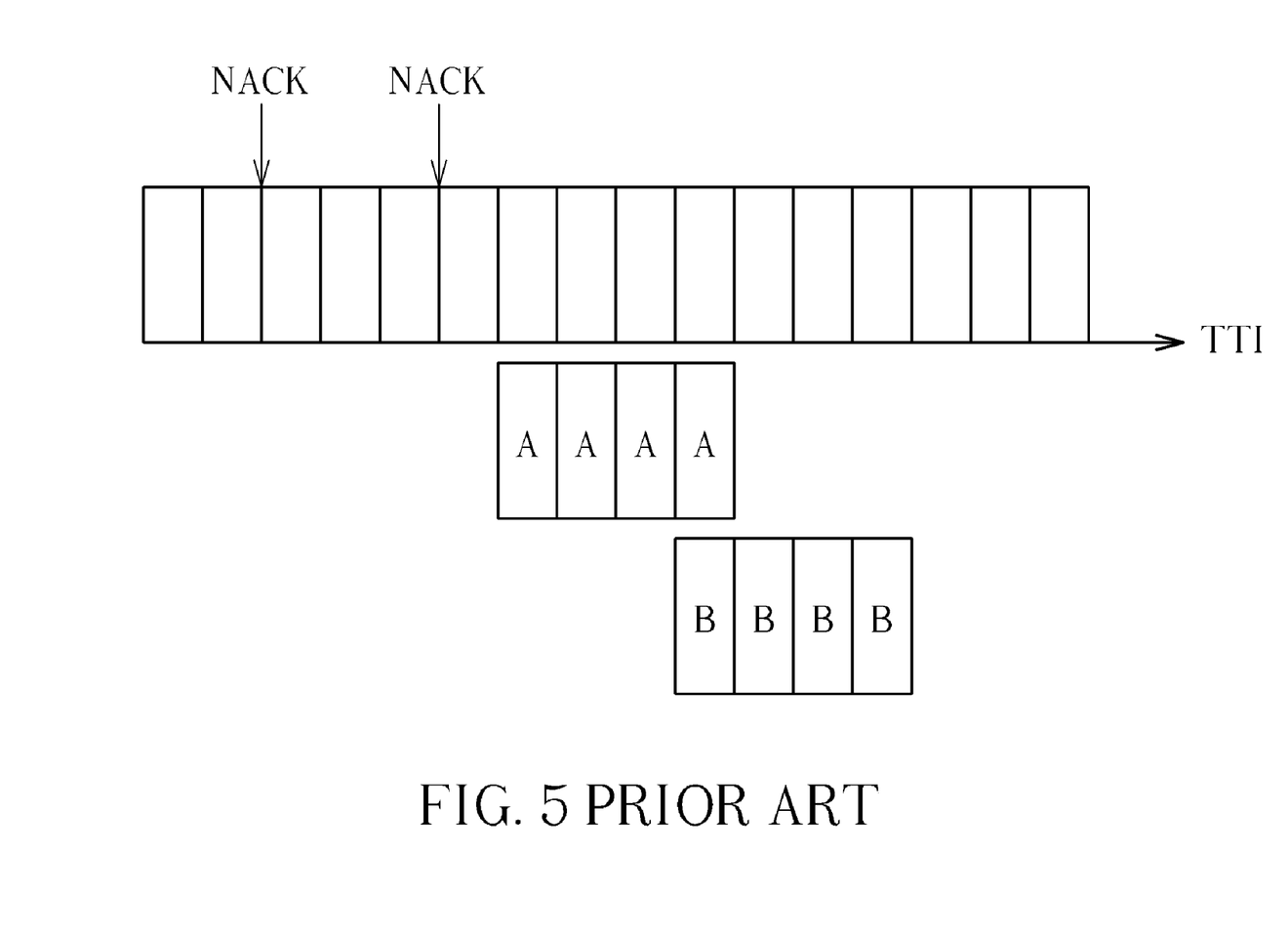

Please refer to FIG. 4 and FIG. 5, which are timing diagrams illustrating a transmission collision between bundled transmissions according to the prior art. As shown in FIG. 4, two colliding PDCCH UL grants cause a transmission collision. A bundled adaptive transmission requested by an earlier PDCCH UL grant overlaps another bundled adaptive transmission requested by a later PDCCH UL grant at the last two TTIs. As shown in FIG. 5, a transmission collision is caused by two NACKs. A bundled non-adaptive retransmission triggered by an earlier NACK overlaps another bundled non-adaptive retransmission triggered by a later NACK at the last TTI.

In a brief, for the UE, the transmission collision on TTI bundling is resulted from the indefinite timing of TTI bundling deactivation and the uncertainty that the eNB may not deal with the timing of PDCCH UL grant assignment and HARQ feedback carefully. Note that, like the PDCCH UL grant does, the transmission requested by a persistent UL grant, e.g. a semi-persistent scheduling (SPS) resource, may also collide with another transmission.

SUMMARY OF THE INVENTION

The present invention therefore provides a method and related communication device for improving uplink data transmission of TTI bundling for a MAC layer of a UE in a wireless communication system.

The present invention discloses a method of improving uplink transmission of TTI bundling for a MAC layer of a UE in a wireless communication system. The method includes receiving a first signaling and a second signaling and when a transmission collision happens between a first transmission corresponding to the first signaling and a second transmission corresponding to the second signaling, handling the transmission collision according to a type of the first signaling and a type of the second signaling.

The present invention further discloses a communication device of a wireless communication system for improving uplink transmission of TTI bundling. The communication device includes a means for receiving a first signaling and a second signaling, and a means for handling a transmission collision according to a type of the first signaling and a type of the second signaling when the transmission collision happens between a first transmission corresponding to the first signaling and a second transmission corresponding to the second signaling.

The present invention further discloses a method of improving uplink transmission of TTI bundling for a MAC layer of a UE in a wireless communication system. The method includes performing the first bundled transmission when TTI bundling is activated and suspending any HARQ process after the first bundled transmission.

The present invention further discloses a method of improving uplink transmission of TTI bundling for a MAC layer of a network in a wireless communication system. The method includes activating TTI bundling and performing a collision resolution procedure that handles a collision between a first transmission and a second transmission according to a type of a first signaling corresponding to the first transmission and a type of a second signaling corresponding to the second transmission.

These and other objectives of the present invention will no doubt become obvious to those of ordinary skill in the art after reading the following detailed description of the preferred embodiment that is illustrated in the various figures and drawings.

DETAILED DESCRIPTION

From the above, there are two major types of uplink transmissions, an adaptive transmission and a non-adaptive retransmission, which are decided by corresponding signalings, e.g. PDCCH UL grant and NACK. The adaptive transmission is a new transmission or an adaptive retransmission. Uplink transmission collisions include three types as (1) a non-adaptive retransmission triggered by a HARQ feedback collides with an adaptive transmission request by a PDCCH UL grant, called type 1 collision, (2) two non-adaptive retransmissions triggered by HARQ feedbacks collide, called type 2 collision, and (3) two adaptive transmissions requested by PDCCH UL grants collide, called type 3 collision. The present invention considers these types of collisions carefully and handles them for improving uplink transmission.

Figure 6:
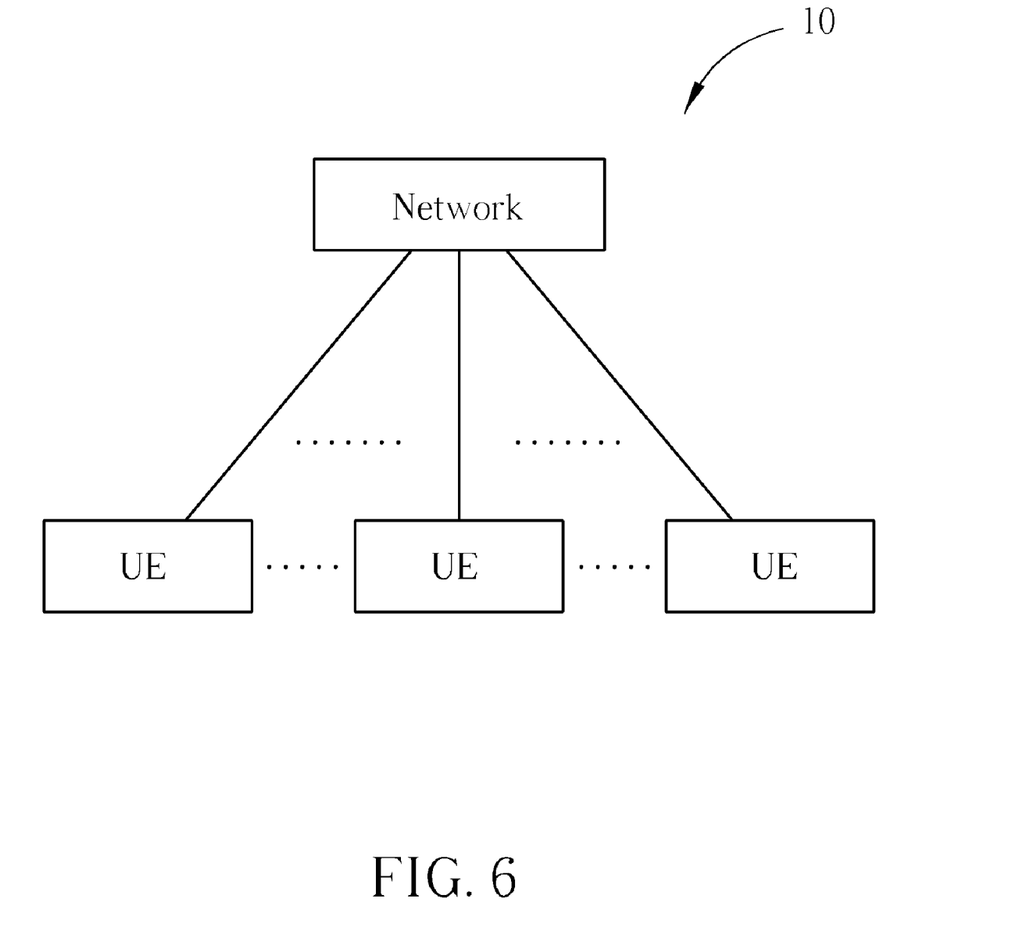
FIG. 6 is a schematic diagram of a wireless communication system.

Please refer to FIG. 6, which is a schematic diagram of a wireless communication system 10. The wireless communication system 10 can be a long-term evolution (LTE) system or other mobile communication systems, and is briefly composed of a network and a plurality of UEs, as the structure illustrated in FIG. 6. In the LTE system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 7:
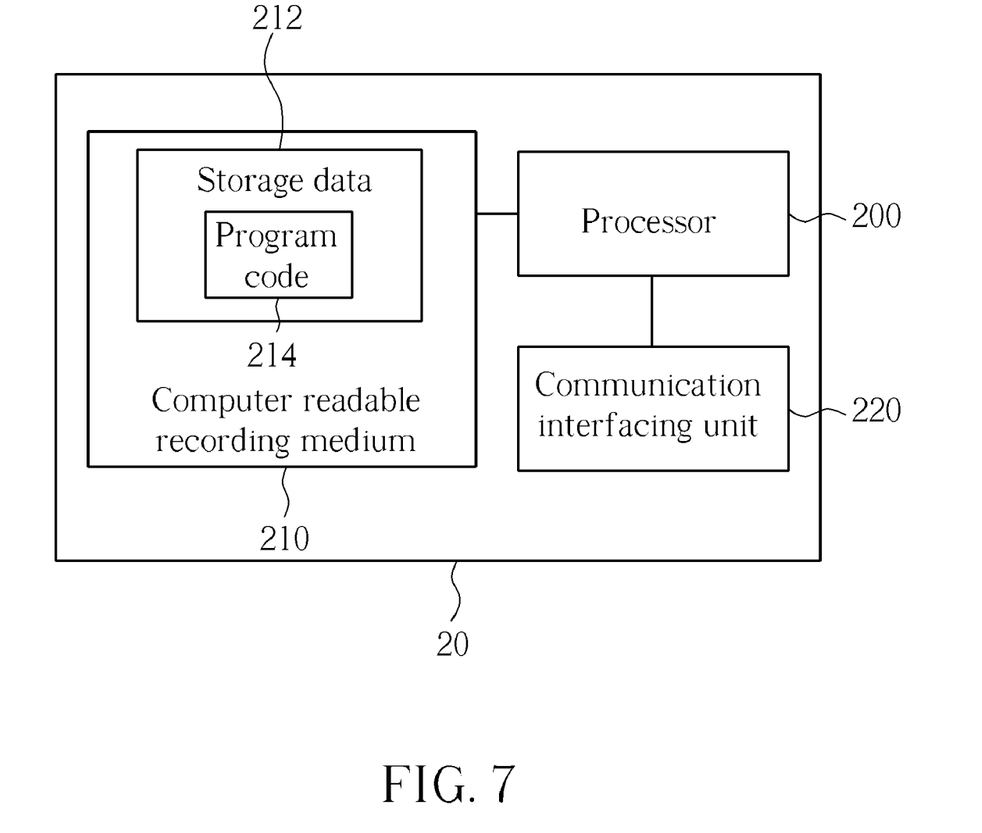
FIG. 7 is a schematic diagram of a communication device according to an example of the present invention.

Please refer to FIG. 7, which is a schematic diagram of a communication device 20 according to an example of the present invention. The communication device 20 can be the UE or the network shown in FIG. 7 and includes a processor 200, a computer readable recording medium 210, and a communication interfacing unit 220. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The communication interfacing unit 220 is preferably a radio transceiver for wirelessly communicating with the network.

Figure 8:
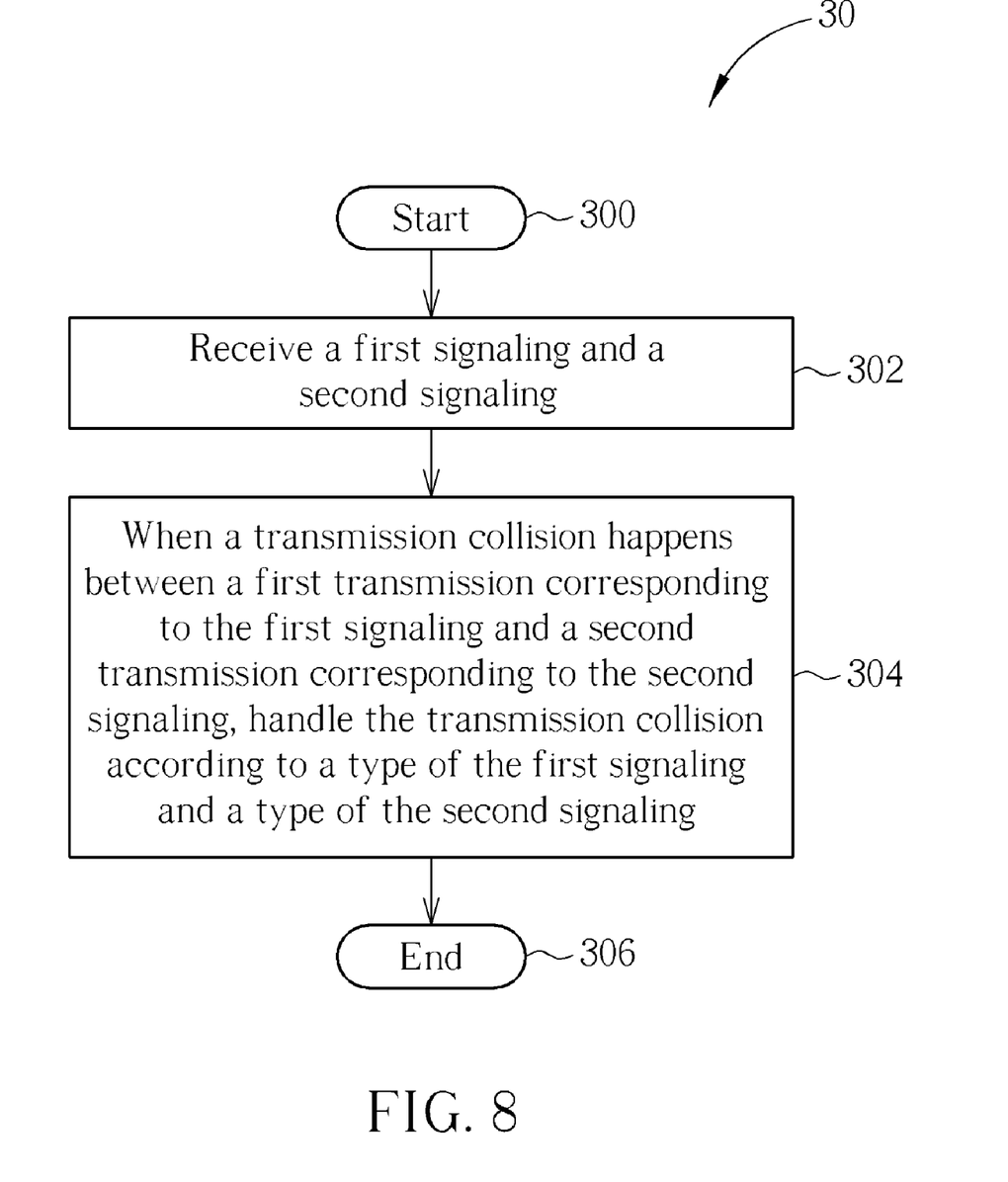
FIG. 8 is a flowchart of a process according to an example of the present invention.

Please refer to FIG. 8, which is a flowchart of a process 30 according to an example of the present invention. The process 30 is utilized for improving UL transmission of TTI bundling for a medium access control (MAC) layer of a UE in the wireless communication system 10 and can be compiled into the program code 214. The process 30 includes the following steps:

Step 300: Start.
Step 302: Receive a first signaling and a second signaling.
Step 304: When a transmission collision happens between a first transmission corresponding to the first signaling and a second transmission corresponding to the second signaling, handle the transmission collision according to a type of the first signaling and a type of the second signaling.
Step 306: End.

In the process 30, each of the first signaling and the second signaling is an UL grant assigned by the eNB for a new transmission or an adaptive retransmission, or a HARQ feedback as a NACK on a physical HARQ indicator channel (PHICH) for a non-adaptive retransmission. The assigned UL grant can be a PDCCH UL grant or a semi-persistent scheduling (SPS) UL grant. If the first signaling is an UL grant, the first transmission is a new transmission or an adaptive retransmission. If the first signaling is a HARQ feedback, the first transmission is a non-adaptive retransmission. Similarly, the second signaling is also an UL grant or a HARQ feedback, and the corresponding second transmission is a new transmission, an adaptive retransmission, or a non-adaptive retransmission.

Figure 9:
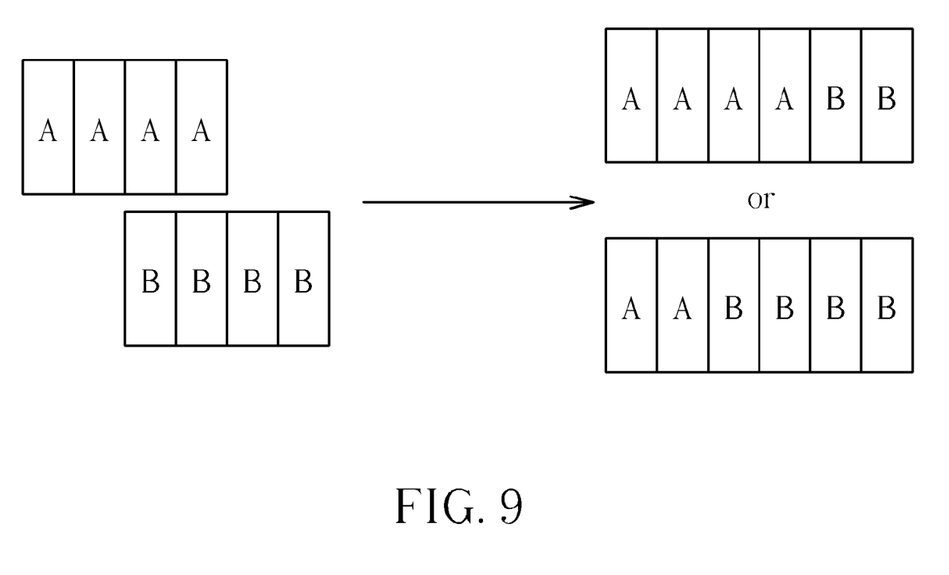
FIG. 9 and FIG. 10 are diagrams illustrating how a UE handles a transmission collision when two bundled transmissions collide according to examples of the present invention.
Figure 10:
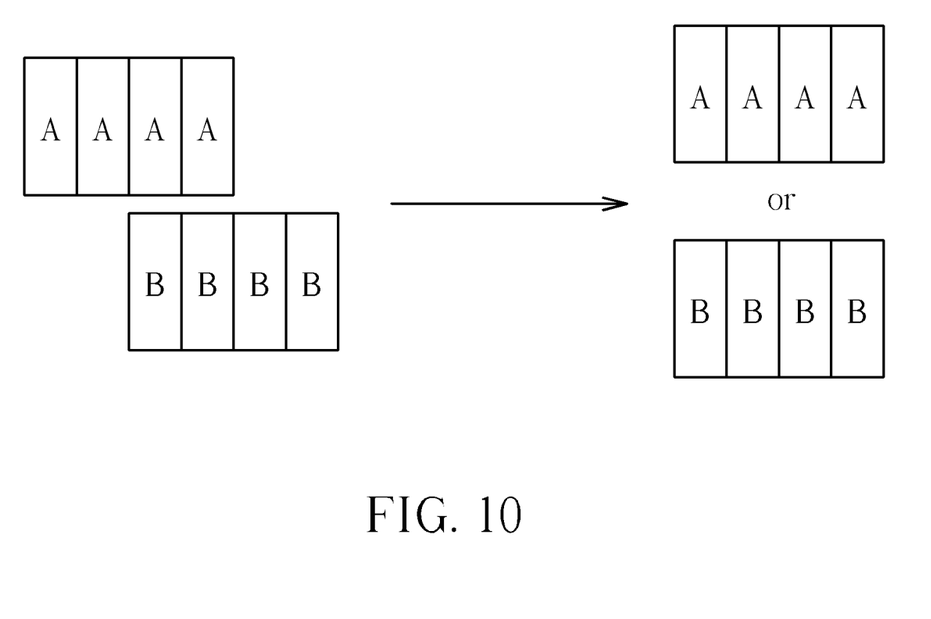

Before Step 304 is introduced, please refer to FIG. 9 and FIG. 10, which are diagrams illustrating how the UE handles a transmission collision when two bundled transmissions collide according to examples of the present invention. FIG. 9 depicts a "concatenate" solution, in which the collision is resolved by concatenating a whole bundled transmission of a higher priority and a part of a bundled transmission of a lower priority, which does not collide with the transmission of the higher priority, and canceling a colliding (overlapped) part. The concatenate solution shown in FIG. 9 includes two scenarios that if the earlier transmission A is prioritized, the UE performs a concatenated transmission as "AAAABB"; and if the later transmission B is prioritized, the UE performs a concatenated transmission as "AABBBB". In addition, FIG. 10 depicts a "non-concatenate" solution, which also includes two scenarios, in which the scheduler of the UE picks only one of colliding grants and HARQ feedbacks which is of a higher priority, and cancels other signalings. Therefore, a whole transmission of a lower priority, whether it is the earlier transmission A or the later transmission B, is cancelled. Note that, if the cancelled transmission is a retransmission, the UE suspends the HARQ process. The suspended HARQ process can be reinitiated by another adaptive retransmission signaling from the eNB.

For the concatenate solution, the radio resource is used more efficiently and the complexity is higher. In comparison, using the non-concatenate solution to handle the transmission collision is simple and fast; no partial transmission is attempted. However, the non-concatenate solution is less efficient for radio resource utilization.

Step 304 comprises three steps (A), (B), and (C) as follows:
(A) when one of the first signaling and the second signaling is an UL grant and the other is a HARQ feedback, handle the transmission collision according to a time order of the UL grant and the HARQ feedback and a type of the UL grant,
(B) when the first signaling and the second signaling are HARQ feedbacks, handle the transmission collision according to a time order of the HARQ feedbacks, and
(C) when the first signaling and the second signaling are UL grants, handle the transmission collision according to a time order of the UL grants.

The step (A) resolves the type 1 collision, which comprises following three scenarios with respect to the time order of the UL grant and the HARQ feedback and the type of the UL grant. First, when the HARQ feedback is earlier than the UL grant and the UL grant is for a new transmission, the UE prioritizes the UL grant and handles the collision by the concatenate solution or by the non-concatenate solution. For the concatenate solution, the UE concatenates a bundle of the new transmission requested by the UL grant and a part of the non-adaptive retransmission triggered by the HARQ feedback which does not collide with the new transmission, and cancels a part of the non-adaptive retransmission colliding with the new transmission. Therefore, the UE performs a concatenated transmission as the transmission "AABBBB" depicted in FIG. 9. In addition, for the non-concatenate solution, the UE cancels the earlier HARQ feedback, and the HARQ process continues with the later new transmission, as the transmission "BBBB" depicted in FIG. 10.

Second, when the HARQ feedback is earlier than the UL grant and the UL grant is for an adaptive retransmission which is in a HARQ process the same as a non-adaptive retransmission triggered by the earlier HARQ feedback, the UE prioritizes either the earlier HARQ feedback or the later UL grant and handles the collision by the concatenate solution or by the non-concatenate solution. When the earlier HARQ feedback is prioritized, for the concatenate solution, the UE concatenates a bundle of the non-adaptive retransmission and a part of the adaptive retransmission which does not collide with the non-adaptive retransmission, and cancels a part of the adaptive retransmission colliding with the non-adaptive retransmission. In other words, the UE performs a concatenated transmission as the transmission "AAAABB" depicted in FIG. 9. And, for the non-concatenate solution, the UE cancels the UL grant and continues the HARQ process with the earlier non-adaptive retransmission. In addition, when the later UL grant is prioritized, the UE concatenates a bundle of the adaptive retransmission with a part of the non-adaptive retransmission which does not collide with the adaptive retransmission, and cancels apart of the non-adaptive retransmission colliding with the adaptive transmission, so as to perform a concatenated transmission as "AABBBB" depicted in FIG. 9. Or, the UE cancels the HARQ feedback and continues the HARQ process with the adaptive retransmission.

Third, when the UL grant, whether it is for a new transmission or for an adaptive retransmission, is earlier than the HARQ feedback, and a non-adaptive retransmission triggered by the HARQ feedback is in the same HARQ process as an adaptive transmission requested by the UL grant, the UE prioritizes the UL grant and handles the collision by the concatenate solution or by the non-concatenate solution. For the concatenate solution, the UE concatenates a bundle of the adaptive transmission and a part of the non-adaptive retransmission which does not collide with the adaptive transmission and cancels a part of the non-adaptive retransmission colliding with the adaptive transmission so as to perform a concatenated transmission as "AAAABB" depicted in FIG. 9. And, for the non-concatenate solution, the UE cancels the later HARQ feedback.

When the type 2 collision happens, i.e., the first transmission and the second transmission which are non-adaptive retransmissions collide, the UE performs the step (B) to handle the transmission collision according to a time order of the HARQ feedbacks. The UE prioritizes either the earlier HARQ feedback or the later HARQ feedback, and applies the concatenate solution or the non-concatenate solution to resolve the collision.

When the earlier HARQ feedback is prioritized, for the concatenate solution, the UE concatenates a bundle of the earlier non-adaptive retransmission and a part of the later non-adaptive retransmission which does not collide with the earlier non-adaptive retransmission, and cancels a part of the later non-adaptive retransmission colliding with the earlier transmission, to perform a concatenated transmission as "AAAABB" depicted in FIG. 9. For the non-concatenate solution, the UE cancels the later HARQ feedback (which is one of the first signaling and the second signaling) and continues the HARQ process with the earlier non-adaptive retransmission.

On the other hand, when the later HARQ feedback is prioritized, the UE concatenates a bundle of the later non-adaptive retransmission and a part of the earlier non-adaptive retransmission which does not collide with the later non-adaptive retransmission, and cancels a part of the earlier non-adaptive retransmission colliding with the later non-adaptive retransmission, so as to perform a concatenated transmission as "AABBBB" depicted in FIG. 9. Or, the UE cancels the earlier HARQ feedback and continues the HARQ process with the later non-adaptive retransmission. Note that, for the non-concatenate solution, the HARQ entity has the option to change HARQ information in the middle of a bundle, e.g. Redundancy Version (RV) is changed for the latter part of the bundle.

The step (C) resolves type 3 collision. When two adaptive transmissions collide, whether the UL grants which cause the collision are for new transmission in the same HARQ process, for adaptive retransmissions in the same HARQ process, or one for a new transmission and the other for an adaptive retransmission in the same HARQ process, the UE handles the transmission collision according to a time order of the UL grants. In other words, the UE prioritizes either the earlier UL grant or the later UL grant. Also, the UE handles the collision by the concatenate solution or by the non-concatenate solution. Note that, the present invention prefers to prioritize the later UL grant because the eNB could have more processing time and has a better view of the future schedule, and it is also reasonable to prioritize the later UL grant when taking the UE complexity into consideration.

When the later UL grant is prioritized, for the concatenate solution, the UE concatenates a bundle of a later adaptive transmission and a part of an earlier adaptive transmission which does not collide with the later adaptive transmission, and cancels a part of the earlier adaptive transmission colliding with the later adaptive transmission, to perform a concatenated transmission as "AABBBB" depicted in FIG. 9 and continues the HARQ process with the later adaptive transmission. Or, for the non-concatenate solution, the UE cancels the earlier UL grant and continues the HARQ process with the later adaptive transmission.

On the other hand, when the earlier UL grant is prioritized, for the concatenate solution, the UE concatenates a bundle of the earlier adaptive transmission and a part of the later adaptive transmission which does not collide with the earlier adaptive transmission and cancels a part of the later adaptive transmission colliding with the earlier adaptive transmission, to perform a concatenated transmission as "AAAABB" depicted in FIG. 9, and continues the HARQ process with the earlier transmission. Also, for the non-concatenate solution, the UE cancels the later UL grant and continues the HARQ process with the earlier adaptive transmission.

In summary, Step 304 consisting of the step (A), (B) and (C) resolves types 1, type 2, and type 3 collisions respectively. The steps (A), (B) or (C) comprise several alternatives, each resolving a transmission collision by the concatenate solution or by the non-concatenate solution according to types of signalings bringing the collision and/or according to a time order of the signalings. Note that, the process 30 is also applied for removing the transmission collision between a bundled transmission and a non-bundled. Through the process 30, the transmission collisions that easily happen when TTI bundling is configured are resolved.

Figure 11:
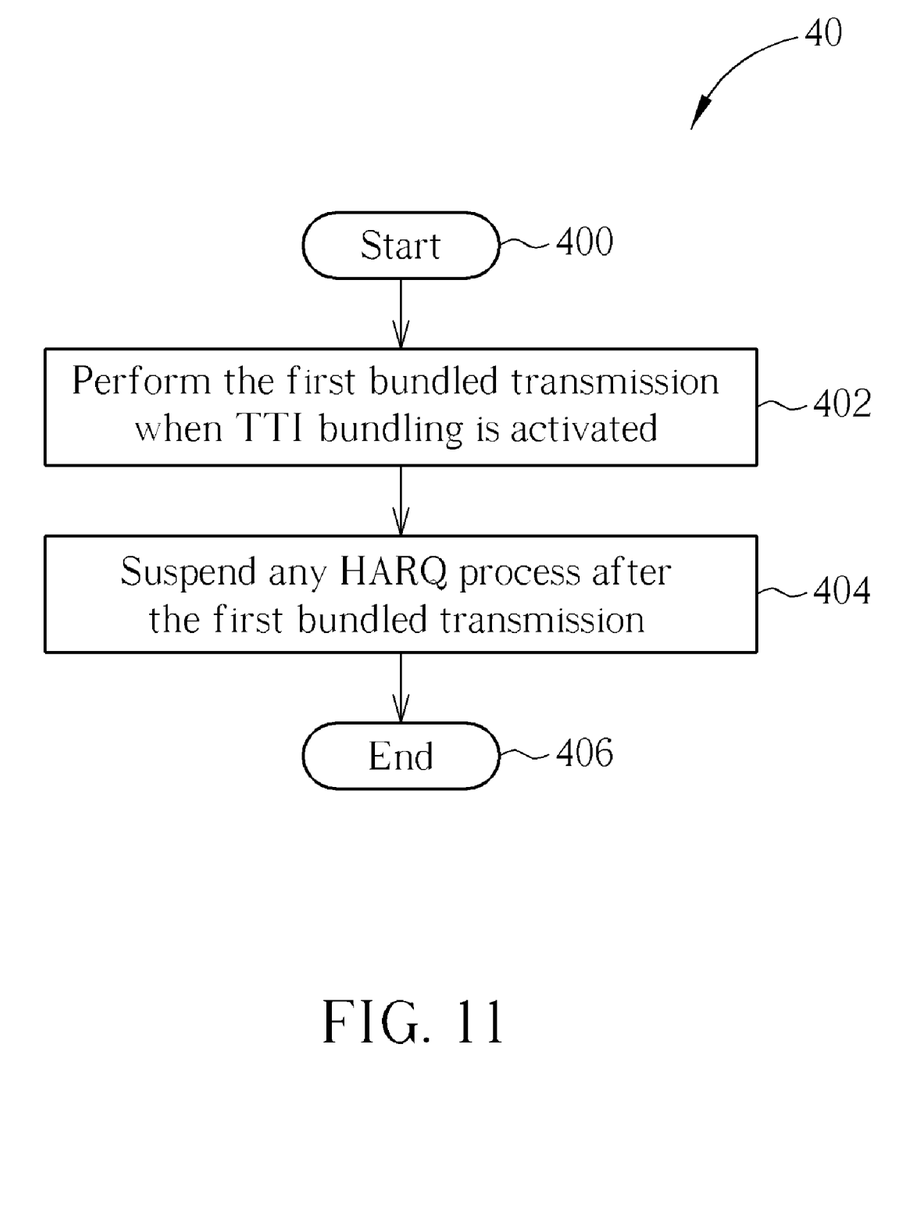
FIG. 11 is a flowchart of a process according to an example of the present invention.

The process 30 is an efficient solution for the transmission collision. In the process 30, the UE has to associate types of signalings with different solutions for transmission collisions and reacts properly, which increases complexity of the UE. The present invention further provides a simple solution to resolve the transmission collision. Please refer to FIG. 11, which is a flowchart of a process 40 according to an example of the present invention. The process 40 is utilized for improving UL transmission of TTI bundling for a medium access control (MAC) layer of a UE in the wireless communication system 10 and can be compiled into the program code 214. The process 40 includes the following steps:

Step 400: Start.

Step 402: Perform the first bundled transmission when TTI bundling is activated.

Step 404: Suspend any HARQ process after the first bundled transmission.

Step 406: End.

According to the process 40, after performing the first bundled transmission, the UE suspends any HARQ process. Therefore, all possible retransmissions are done by adaptive retransmissions signaled by the PDCCH signaling from eNB. Step 404 of suspending any HARQ process, for example, is to set a last received HARQ feedback to an ACK for any HARQ process. The process 40 simplifies the collision environment and decreases the complexity for the eNB to handle the retransmission. Although the process 40 gets rid of the collision between non-adaptive retransmissions by suspending any HARQ process, collisions among new transmissions or adaptive retransmissions are still not resolved.

Figure 12:
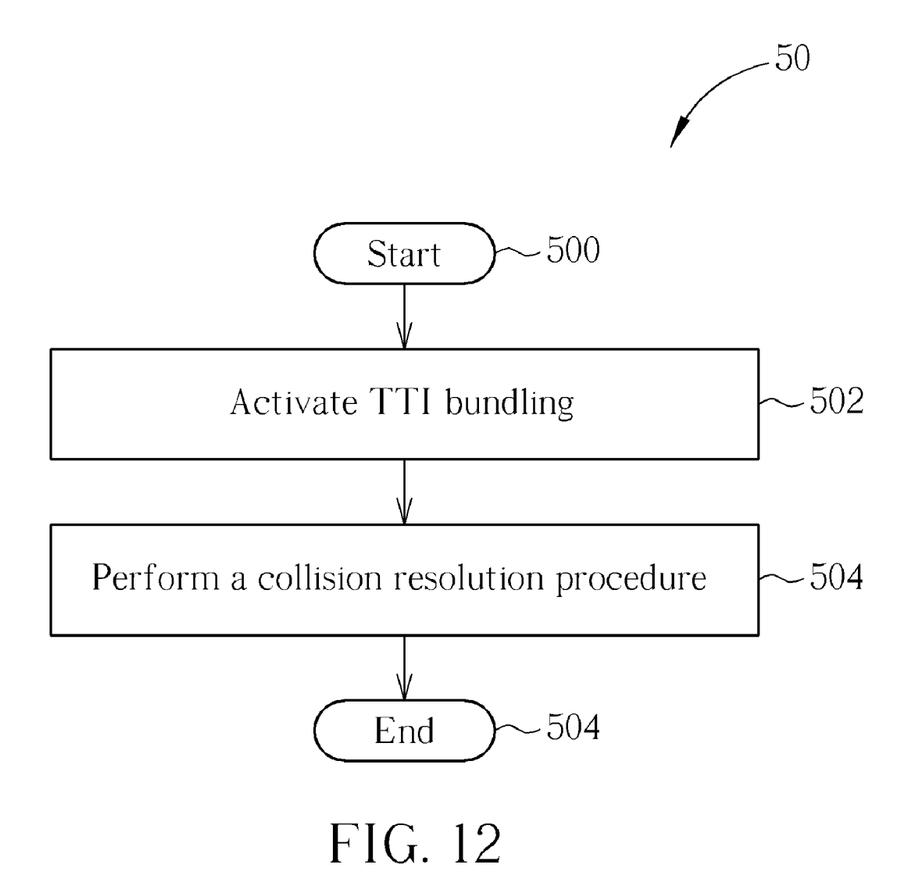
FIG. 12 is a flowchart of a process according to an example of the present invention.

The above processes for resolving the transmission collision are performed by the scheduler in the UE. Furthermore, the present invention considers that the serving eNB has to know how the UE acts on the transmission collision, for synchronizing the HARQ process. Please refer to FIG. 12, which is a flowchart of a process 50 according to an example of the present invention. The process 50 is utilized for improving UL transmission of TTI bundling for a network in the wireless communication system 10 and can be compiled into the program code 214. The process 50 includes the following steps:

Step 500: Start.

Step 502: Activate TTI bundling.

Step 504: Perform a collision resolution procedure.

Step 506: End.

Note that the collision resolution procedure used in the network is the same as that used in the UE, which can be the process 30 that handles a collision between a first transmission and a second transmission according to a type of a first signaling corresponding to the first transmission and a type of a second signaling corresponding to the second transmission, or can be the process 40 that performs the first bundled transmission and then suspends any HARQ process after the first bundled transmission. According to the process 50, the HARQ entity at the network (eNB) follows the collision resolution procedure, that is, the HARQ process of the UE is synchronized with the HARQ process of the eNB. Therefore, the HARQ entity at the eNB can identify the correct HARQ process and can receive transport blocks successfully.

Please note that the steps in the process 30, the process 40, or the process 50 and detailed steps related to each process can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (SIP), or computer on module (COM).

In the prior art, there are several reasons for a transmission collision, including the uncertainty of the timing of TTI bundling deactivation and the careless signaling assigned by the eNB when TTI bundling is activated, and the UE does not handle the collisions. According to the present invention, when a transmission collision happens, the UE carefully considers types of received signalings bringing the collision and a time order of the received signalings, and uses the concatenate solution or the non-concatenate solution to remove the collision according to the concern of complexity or transmission efficiency. Therefore, uplink transmission of TTI bundling is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of improving uplink transmission of transmission time interval, abbreviated to TTI, bundling for a medium access control (MAC) layer of a user equipment in a wireless communication system, the method comprising:
receiving an earlier, first signaling corresponding to a first transmission and a later, second signaling corresponding to a second transmission while TTI bundling is activated, wherein the first signaling or the second signaling is a physical downlink control channel (PDCCH) uplink (UL) grant, a semi-persistent scheduling (SPS) UL grant, or a negative acknowledgement (NACK);
when determining that the first transmission collides with the second transmission
and determining that
(1) the first signaling is a NACK and the second signaling is an UL grant for a new transmission
or that
(2) the first signaling is a NACK and the second signaling is an UL grant for an adaptive retransmission which is in a same hybrid automatic repeat request (HARQ) process as a non-adaptive retransmission triggered by the NACK,
or that
(3) the first signaling and the second signaling are NACKs,
or that
(4) the first signaling and the second signaling are UL grants for new transmissions or adaptive retransmissions which are in the same HARQ process,
concatenating a bundle of the second transmission and a part of the first transmission which does not collide with the second transmission; and
canceling a part of the first transmission colliding with the second transmission.

2. A method of improving uplink transmission of transmission time interval, TTI, bundling for a medium access control, MAC, layer of a user equipment, UE, in a wireless communication system, the method comprising:
receiving an earlier, first signaling corresponding to a first transmission and a later, second signaling corresponding to a second transmission while TTI bundling is activated, wherein the first signaling or the second signaling is a physical downlink control channel, PDCCH, uplink, UL, grant, a semi-persistent scheduling, SPS, uplink, UL, grant, or a negative acknowledgement, NACK;
when determining that
the first transmission collides with the second transmission
and determining that
(1) the first signaling is a NACK and the second signaling is an UL grant for an adaptive retransmission which is in a same hybrid automatic repeat request, HARQ, process as a non-adaptive retransmission triggered by the NACK,
or that
(2) the first signaling is an UL grant and the second signaling is a NACK which triggers a non-adaptive retransmission in the same HARQ process as an adaptive transmission requested by the UL grant,
or that
(3) the first signaling and the second signaling are NACKs,
or that
(4) the first signaling and the second signaling are UL grants for new transmissions or adaptive retransmissions which are in the same HARQ process,
concatenating a bundle of the first transmission and a part of the second transmission which does not collide with the first transmission; and
canceling a part of the second transmission colliding with the first transmission.

* * * * *